United States Patent
Song et al.

(10) Patent No.: US 12,278,711 B2
(45) Date of Patent: *Apr. 15, 2025

(54) INFORMATION TRANSMISSION METHOD AND APPARATUS, INFORMATION PROCESSING METHOD AND APPARATUS, TERMINAL, NETWORK ELEMENT AND STORAGE MEDIUM

(71) Applicant: ZTE CORPORATION, Shenzhen (CN)

(72) Inventors: Xueyan Song, Shenzhen (CN); Xingyue Zhou, Shenzhen (CN); Shuang Liang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/423,056

(22) Filed: Jan. 25, 2024

(65) Prior Publication Data
US 2024/0171425 A1    May 23, 2024

Related U.S. Application Data

(63) Continuation of application No. 17/787,896, filed as application No. PCT/CN2020/127423 on Nov. 9, 2020, now Pat. No. 11,888,649.

(30) Foreign Application Priority Data

Dec. 18, 2019    (CN) .......................... 201911311601.3

(51) Int. Cl.
    *H04L 12/46*    (2006.01)
    *H04L 69/00*    (2022.01)
(52) U.S. Cl.
    CPC .......... *H04L 12/4633* (2013.01); *H04L 69/26* (2013.01); *H04L 2212/00* (2013.01)

(58) Field of Classification Search
None
See application file for complete search history.

(56) References Cited

U.S. PATENT DOCUMENTS

| | | | |
|---|---|---|---|
| 10,993,142 B2* | 4/2021 | Liu | H04W 28/06 |
| 2013/0083726 A1* | 4/2013 | Jain | H04W 4/70 |
| | | | 370/328 |
| 2020/0037220 A1* | 1/2020 | Velev | H04W 76/27 |

FOREIGN PATENT DOCUMENTS

| | | | | |
|---|---|---|---|---|
| WO | WO2009/158703 A1 | 12/2009 | | |
| WO | WO-2018063453 A1 * | 4/2018 | ............. | H04L 47/12 |

OTHER PUBLICATIONS

European Search Report in Application No. 20900880.4, dated Dec. 20, 2023, 6 pages.

(Continued)

*Primary Examiner* — Phyllis A Book
(74) *Attorney, Agent, or Firm* — Morgan, Lewis & Bockius LLP

(57) ABSTRACT

Provided are an information transmission method and apparatus, an information processing method and apparatus, a terminal, a network element, and a storage medium. The information transmission method includes encapsulating non-access stratum (NAS) information and access resource (AS) parameter information in a vendor-specific protocol (VSP) packet, where the NAS information includes NAS system information and NAS customization information, and the AS parameter information is used for wired side resource negotiation; encapsulating establishment signaling of a wired access network control plane channel in a vendor-specific network control protocol (VSNCP) packet; and transmitting, through the VSP packet, the NAS information and the AS parameter information.

17 Claims, 5 Drawing Sheets

(56) References Cited

OTHER PUBLICATIONS

"3rd Generation Partnership Project", Technical Specification Group Services and System Aspects; System Architecture for the 5G System; Stage 2 (Release 16), 3GPP Draft; 23501-G30_CRS_IMPLEMENTED, 3rd Generation Partnership Project (3GPP), Mobile Competence Centre ; 650, Route Des Lucioles ; F-06921 Sophia-Antipolis Cedex ; France Dec. 10, 2019 (Dec. 10, 2019), XP051839480, 410 pages.

* cited by examiner

INFORMATION TRANSMISSION METHOD AND APPARATUS, INFORMATION PROCESSING METHOD AND APPARATUS, TERMINAL, NETWORK ELEMENT AND STORAGE MEDIUM

CROSS-REFERENCES TO RELATED APPLICATIONS

This is a Continuation Application of U.S. patent application U.S. Ser. No. 17/787,896, filed Jun. 21, 2022, now U.S. Pat. No. 11,888,649, which is a U.S. national stage application of International Patent Application No. PCT/CN2020/127423, filed Nov. 9, 2020, which claims priority to Chinese Patent Application No. 201911311601.3 filed with the China National Intellectual Property Administration (CNIPA) on Dec. 18, 2019, the disclosures of which are incorporated herein by reference in their entireties.

TECHNICAL FIELD

The present application relates to a wireless communication network, for example, an information transmission method and apparatus, an information processing method and apparatus, a terminal, a network element, and a storage medium.

BACKGROUND

In the 5th Generation Mobile Networks (5G) Wireline Wireless Convergence (WWC) technology, a wired side runs a non-access stratum (NAS) protocol through an N1 interface, a 5G access gateway function (AGF) supports the N1 interface or a corresponding proxy, and transmission of NAS information affects the intercommunication between user equipment (UE) and a 5G wireless core network. In addition, in a process of transmitting NAS information, corresponding access resources need to be created for the UE to access the network. In NAS information transmission from a 5G residential gateway (RG) to the 5G AGF, there is a lack of effective mechanisms to transmit NAS system information and related NAS information that needs to be transmitted to the 5G AGF through an underlying transmission control protocol for processing so that NAS information transmission has low reliability, thereby affecting registration and authentication of the UE by an access and mobility management function (AMF) and also affecting creation and use of access resources.

SUMMARY

The present application provides an information transmission method and apparatus, an information processing method and apparatus, a terminal, a network element, and a storage medium so as to provide NAS information transmission with high reliability and provide effective access resources.

An embodiment of the present application provides an information transmission method. The method includes the following.

Non-access stratum (NAS) information and access resource (AS) parameter information are encapsulated in a vendor-specific protocol (VSP) packet, where the NAS information includes NAS system information and NAS customization information.

Establishment signaling of a wired access network control plane channel is encapsulated in a vendor-specific network control protocol (VSNCP) packet.

The NAS information is transmitted through the VSP packet and the VSNCP packet.

An embodiment of the present application further provides an information processing method. The method includes the following.

A vendor-specific protocol (VSP) packet and a vendor-specific network control protocol (VSNCP) packet are received, where non-access stratum (NAS) information and access resource (AS) parameter information are encapsulated in the VSP packet, the NAS information includes NAS system information and NAS customization information, the AS parameter information is used for wired side resource negotiation, and establishment signaling of a wired access network control plane channel is encapsulated in the VSNCP packet.

The NAS information and the AS parameter information are processed through the VSP packet and the VSNCP packet.

An embodiment of the present application further provides an information transmission apparatus. The apparatus includes a first encapsulation module, a second encapsulation module, and a transmission module.

The first encapsulation module is configured to encapsulate non-access stratum (NAS) information and access resource (AS) parameter information in a vendor-specific protocol (VSP) packet, where the NAS information includes NAS system information and NAS customization information, and the AS parameter information is used for wired side resource negotiation.

The second encapsulation module is configured to encapsulate establishment signaling of a wired access network control plane channel in a vendor-specific network control protocol (VSNCP) packet.

The transmission module is configured to transmit the NAS information and the AS parameter information through the VSP packet and the VSNCP packet.

An embodiment of the present application further provides an information processing apparatus. The apparatus includes a receiving module and a processing module.

The receiving module is configured to receive a vendor-specific protocol (VSP) packet and a vendor-specific network control protocol (VSNCP) packet, where non-access stratum (NAS) information and access resource (AS) parameter information are encapsulated in the VSP packet, the NAS information includes NAS system information and NAS customization information, the AS parameter information is used for wired side resource negotiation, and establishment signaling of a wired access network control plane channel is encapsulated in the VSNCP packet.

The processing module is configured to process the NAS information and the AS parameter information through the VSP packet and the VSNCP packet.

An embodiment of the present application further provides a terminal. The terminal includes one or more processors and a storage apparatus.

The storage apparatus is configured to store one or more programs.

When executed by the one or more processors, the one or more programs cause the one or more processors to perform the preceding information transmission method.

An embodiment of the present application further provides a network element. The network element includes one or more processors and a storage apparatus.

The storage apparatus is configured to store one or more programs.

When executed by the one or more processors, the one or more programs cause the one or more processors to perform the preceding information processing method.

An embodiment of the present application further provides a computer-readable storage medium which is configured to store a computer program which, when executed by a processor, performs the preceding information transmission method or information processing method.

DETAILED DESCRIPTION

Figure 1:
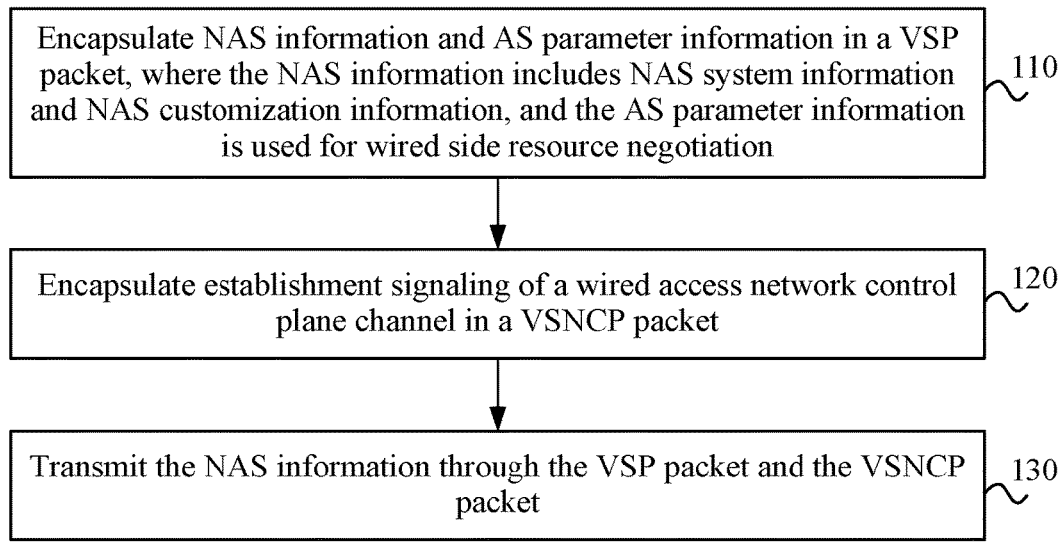
FIG. 1 is a flowchart of an information transmission method according to an embodiment.

The present application is described below in conjunction with drawings and embodiments. The embodiments described herein are merely intended to explain and not to limit the present application. It is to be noted that if not in collision, embodiments of the present application and features therein may be combined with each other in any manner.

A fixed network-residential gateway based on WWC technology can be connected to both a Wireline-Access Network (W-AN) or a radio access network (RAN). Bit errors generally occur in clusters. For a wired side, after connected to a wired access network, the fixed network-residential gateway (FN-RG) device or the 5th Generation-Residential Gateway (5G-RG) device can intercommunicate with a 5G wireless core network through a newly added 5G AGF. According to a standard specification, the 5G-RG supports an N1 interface protocol and can communicate with the 5G core network through an N2 interface of the 5G AGF, while the FN-RG does not support the N1 interface protocol and communicates with the 5G core network through the 5G AGF supporting the N1 and serving as a proxy of the N1 of the FN-RG.

The AGF of a 5G technology center is a virtualized network function (VNF) with separate transfer and control. A control plane is encapsulated to the N2 interface through the N1 interface so as to implement registration and authentication to the AMF of the 5G core network, and a user plane is connected to a user plane function (UPF) of the 5G core network through an N3 interface. According to the 3rd Generation Partnership Project (3GPP) standard, the N1 interface runs a NAS protocol, the N2 interface runs the Stream Control Transmission Protocol (SCTP), and the N3 interface runs the General Packet Radio service (GPRS) Tunneling Protocol User Plane (GTP-U). The wired side needs to nut the NAS protocol at the N1 interface. In this case, transmission of NAS information on the wired side is a key link for a user to access the core network and implement authentication and registration. In this process, corresponding access resources need to be created for the UE to access the network. There is a lack of effective mechanisms to transmit NAS system information and related NAS information that needs to be transmitted to the 5G AGF through an underlying transmission control protocol for processing so that NAS information transmission has low reliability, thereby affecting registration and authentication of the UE by the AMF and also affecting creation and use of access resources.

An embodiment of the present application provides an information transmission method applied to the UE. The method includes encapsulating, through a VSP packet, NAS information and AS parameter information, and encapsulating, through a VSNCP packet, establishment signaling of a wired access network control plane channel, so as to carry transmission of the VSP packet through the wired access network control plane channel, thereby transmitting the NAS information and the AS parameter information to an AGF. In this manner, transmission reliability of the NAS information and AS information is improved. After obtaining the NAS information, the AGF can communicate with an AMF, thereby implementing user registration and authentication; after obtaining the AS information, the AGF completes wired side resource negotiation and provides effective access resources.

FIG. 1 is a flowchart of an information transmission method according to an embodiment. As shown in FIG. 1, the method provided in this embodiment includes 110 to 130 described below.

In 110, NAS information and AS parameter information are encapsulated in a VSP packet, where the NAS information includes NAS system information and NAS customization information, and the AS parameter information is used for wired side resource negotiation.

In 120, establishment signaling of a wired access network control plane channel is encapsulated in a VSNCP packet.

In 130, the NAS information and the AS parameter information are transmitted through the VSP packet and the VSNCP packet.

In this embodiment, the NAS information and the AS parameter information are encapsulated in the VSP packet, and transmission of the NAS information and the AS parameter information is between 5G-RG and AGF. Data encapsulated in the VSP packet may be divided into two types according to different processing methods: in one type, the NAS customization information and the AS parameter information that can be processed by the AGF are used for selection of the AMF and wired side network resources negotiation, respectively; in the other type, the NAS system information that AGF does not directly process and needs to be transparently transmitted by the AGF can be transmitted to the AMF through an N2 interface of the AGF, so as to implement user registration and authentication request processing, user registration cancellation, or a registration service request. The AS parameter information includes resource parameters that need to be carried in resource negotiation between the 5G-RG and the AGF in a process of creating user plane resources on the wired side, such as physical resources and local policies.

The NAS system information includes user subscription information transmitted by the UE to an access network (AN), such as AN parameters and registration request information. A radio resource control (RRC) protocol may be used for broadcasting the NAS system information. The NAS customization information includes NAS-related system information that needs to be encapsulated by the UE according to the RRC protocol during an RRC establishment process, is notified from an NAS upper layer to a transport layer, and is transmitted to a network side according to a transport layer control protocol, such as a temporary mobile subscriber identifier (TMSI) and a public land mobile network (PLMN).

Establishment signaling of the wired access network control plane channel is encapsulated in the VSNCP packet. Before the NAS information is transmitted through the VSP packet, the wired access network control plane channel may be established with the AGF so as to carry transmission of the VSP packet.

The information transmission method in this embodiment provides an effective transmission mechanism of the NAS information and the AS parameter information. The wired access network control plane channel is established by using the VSP packet and the VSNCP packet and the NAS system information and the NAS customization information are transmitted so that transmission reliability of the NAS information is improved. After acquiring the NAS customization information and the AS parameter information, the AGF can perform forwarding or implement selection of the AMF so that after acquiring the NAS information, the AMF implements registration and authentication of UE users and completes wired side resource negotiation.

Figure 2:
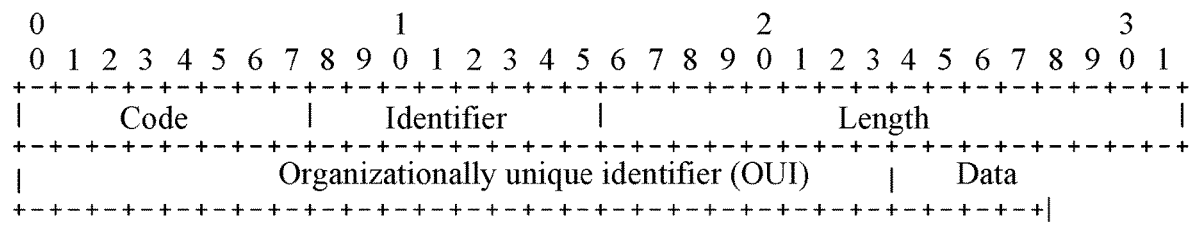
FIG. 2 is a schematic diagram of a VSNCP packet format according to an embodiment.

FIG. 2 is a schematic diagram of a VSNCP packet format according to an embodiment. The VSNCP is a protocol for vendor characteristics and encapsulated in an information field of a point-to-point protocol (PPP), and a value of a corresponding protocol field is set to 805 b (VSNCP). As shown in FIG. 2, the VSNCP packet includes 8 bits of code fields used for identifying a type of a Link Control Protocol (LCP) packet, such as a request packet or a response packet. Field values of 1 to 7 correspond to Configure-Request, Configure-Ack, Configure-Nak, Configure-Reject, Terminate-Request, Terminate-Ack, and Code-Reject, and other values are replied with Code-Reject. An organizationally unique identifier (OUI) field is used for characterizing characteristics of an operator. An identifier field is an identifier of the request packet or the response packet of the LCP packet for easy matching. A length field identifies a size of specific data of the LCP packet. A Data field is used for carrying data information for a packet.

In an embodiment, the VSNCP packet includes an OUI field, where the OUI field is used for indicating establishment of a wired access network control plane channel; and the OUI field is designated by an internet assigned numbers authority (IANA).

In this embodiment, for the case where the VSNCP packet carries transmission of the NAS information and the AS parameter information, the OUI field is extended, the UE applies to the LANA in advance, and the LANA designates a specific OUI field value, where the field value is designated from a CF0000 series such as CF0001.

In an embodiment, the VSNCP packet includes a code field, where the code field satisfies at least one of the following: in the case where the code field is a third set value, the VSNCP packet is used for transmitting establishment request information of the wired access network control plane channel; in the case where the code field is a fourth set value, the VSNCP packet is used for transmitting establishment response information of the wired access network control plane channel; in the case where the code field is a fifth set value, the VSNCP packet is used for transmitting establishment response rejection information of the wired access network control plane channel.

In this embodiment, for the case where the VSNCP packet carries transmission of the NAS information, the code field is extended, and the code field of different values indicates that the VSNCP packet is used for transmitting different establishment information. For example, in the case where the value of the code field is 8 (corresponding to bits 1000), the VSNCP packet is used for the transmitting the establishment request (Connection-Request) information of the NAS wired access network control plane channel; in the case where the value of the code field is 9 (corresponding to bits 1001), the VSNCP packet is used for transmitting establishment response (Connection-Accept) information of the NAS wired access network control plane channel; in the case where the value of the code field is 10 (corresponding to bits 1010), the VSNCP packet is used for transmitting establishment response rejection (Connection-Reject) information of the NAS wired access network control plane channel.

In an embodiment, the VSNCP packet includes a Data field, where the Data field satisfies at least one of the following: in the case where the code field is the third set value, the Data field is used for encapsulating the establishment request information; in the case where the code field is the fourth set value, the Data field is used for encapsulating the establishment response information; in the case where the code field is the fifth set value, the Data field is used for encapsulating the establishment response rejection information.

In this embodiment, in the case where the VSNCP packet carries transmission of the NAS information, the Data field is extended, and the establishment information encapsulated in the Data field corresponds to the code field. For example, in the case where the code field is the third set value, the Data field is used for encapsulating the establishment request information; in the case where the code field is the fourth set value, the Data field is used for encapsulating the establishment response information; in the case where the code field is the fifth set value, the Data field is used for encapsulating the establishment response rejection information.

In an embodiment, the VSNCP packet includes an OUI field. In the case where the OUI field is a first identifier, the VSNCP packet is used for carrying transmission of the NAS system information; in the case where the OUI field is a second identifier, the VSNCP packet is used for carrying transmission of the NAS customization information and the AS parameter information.

In this embodiment, the VSNCP packet further includes a length field and a Data field, where the length field and the Data field are used for encapsulating the NAS system information or used for encapsulating the NAS customization information and the AS parameter information.

In this embodiment, the processing of the NAS information and the AS parameter information can also be implemented only by extending the OUI field, where the first identifier (OUI-X) is used for identifying and carrying the NAS system information, and the second identifier (OUI-Y) is used for identifying and carrying the NAS customization information and the AS parameter information. The code field of the VSNCP still reuses an original LCP field. In a establishment process of a VSNCP control plane channel, the 5G-RG side transmits a Configure-Request packet with a VSNCP packet code field value of 1 to the AGF, and the AGF replies to the 5G-RG with a Configure-ACK packet with a VSNCP packet code field value of 2 so that the establishment of the VSNCP control plane channel is successfully implemented. If the AGF abnormally processes the received Configure-Request packet with a VSNCP packet code field value of 1, a Configure-Reject packet with a VSNCP packet code field value of 3 is replied to the 5G-RG so that the establishment of the VSNCP control plane channel is rejected.

Figure 3:
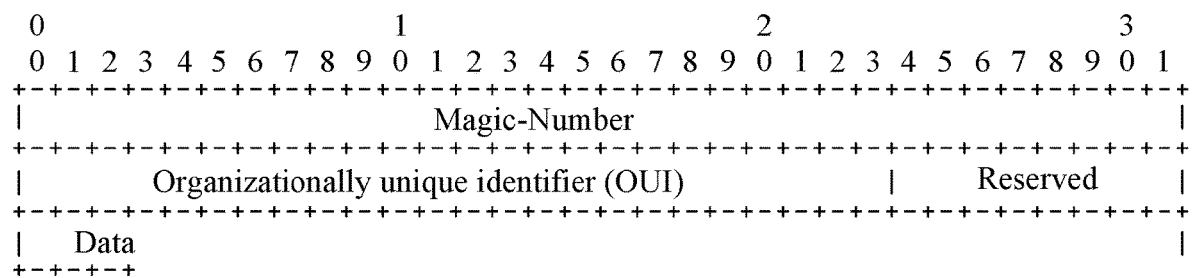
FIG. 3 is a schematic diagram of a VSP packet format according to an embodiment.

FIG. 3 is a schematic diagram of a VSP packet format according to an embodiment. The VSP is an operator-specific protocol and based on the PPP. Transmission of packets can be performed only after a PPP network layer protocol and an authentication phase are completed. The VSP packet is encapsulated in an information field of the PPP, and a value of a corresponding protocol field is set to 405b (VSP). As shown in FIG. 3, the VSP packet includes a Magic-Number field, an OUI field, a reserved field, and a Data field.

The Magic-Number field of 4 bytes is used for detecting a link state of a loopback interface. The OUI field of 3 bytes is used for characterizing characteristics of an operator. The reserved field is of a single-byte type and used for extending applications or functions. The data field is used for carrying data information for a packet.

In an embodiment, the VSP packet includes an OUI field, where the OUI field is used for indicating transmission of the NAS information; and the OUI field is designated by an IANA.

In this embodiment, for the case where the VSP packet supports transmission of the NAS information, the OUI field is extended, the UE applies to the IANA in advance, and the IANA designates a specific OUI field value, where the field value is designated from a CF0000 series such as CF0001.

In an embodiment, the VSP packet includes a reserved field. In the case where the reserved field is a first set value, the VSP packet is used for transmitting the NAS system information; in the case where the reserved field is a second set value, the VSP packet is used for transmitting the NAS customization information and the AS parameter information.

In this embodiment, for the case where the VSP packet supports transmission of the NAS information, the reserved field is extended, and the reserved field of different values indicates that the VSP packet is used for transmitting different NAS information. For example, in the case where the value of the reserved field is 1, the VSP packet is used for transmission of the NAS system information; in the case where the value of the reserved field is 2, the VSP packet is used for transmission of the NAS customization information and the AS parameter information; in the case where the value of the reserved field is another value, another application or function may be extended.

In an embodiment, the VSP packet includes a Data field. In the case where the reserved field is the first set value, the Data field is used for encapsulating the NAS system information; in the case where the reserved field is the second set value, the Data field is used for encapsulating the NAS customization information and the AS parameter information.

In this embodiment, for the case where the VSP packet supports transmission of the NAS information and the AS parameter information, the Data field is extended, and the NAS information encapsulated in the Data field corresponds to the reserved field. For example, in the case where the reserved field is the first set value, the Data field is used for encapsulating the NAS system information such as AN parameters and registration request information; in the case where the reserved field is the second set value, the Data field is used for encapsulating the NAS customization information and the AS parameter information such as TMSI and PLMN.

In an embodiment, the NAS system information includes access network parameters and registration request information.

In this embodiment, the AN parameters are fixed network side specific parameters and include link resource information, policy information, and user operator customization information. The registration request information includes at least one of the following: a registration type, a security parameter, a target network slice selection assistance information (NSSAI) to which access is requested, a core network characteristic parameter accessed by the UE, or packet data unit (PDU) session state information. The PDU session information includes at least one of the following: Registration-Response information, Registration-Accept information, Registration-Modification-Request information, Registration-Modification-Response information, Service-Request information, or Service-Response information.

In an embodiment, the NAS customization information includes at least one of the following: a TMSI, a PLMN, an AMF, or single network slice selection assistance information (S-NSSAI). The NAS customization information is determined according to upper-layer NAS information.

For example, in the case where the upper-layer NAS information provides 5th Generation Single-Temporary Mobile Subscriber Identity (5G-S-TMSI), the NAS customization information includes 5G-S-TMSI information and is transmitted to the network side.

In the case where the upper-layer NAS information provides an PLMN-Identity, the NAS customization information includes PLMN information, where the PLMN information is stored in PLMN information selected in a PLMN-Identity List of system information block 1 (SIB1) of SIBs, and a value of the PLMN-Identity is set as the PLMN information and transmitted to the network side.

In the case where the upper-layer NAS information provides registered AMF, the NAS customization information includes registered AMF information and is transmitted to the network side.

In the case where the upper-layer NAS information provides the S-NSSAI, the NAS customization information includes the S-NSSAI and is transmitted to the network side.

The information transmission method in this embodiment provides an effective transmission mechanism of the NAS information. The NAS information and the AS parameter information are encapsulated through the VSP packet, establishment signaling is encapsulated through the VSNCP packet, the wired access network control plane channel carries the NAS information and the AS parameter information to the AGF, and the AGF further processes the NAS information (such as the AGF transparently transmits the NAS information to the AMF or selects the AMF for transmission of the NAS system information), so as to provide reliable NAS information and AS parameter information for completing the wired side resource negotiation for registration and authentication of the user by the AMF.

Figure 4:
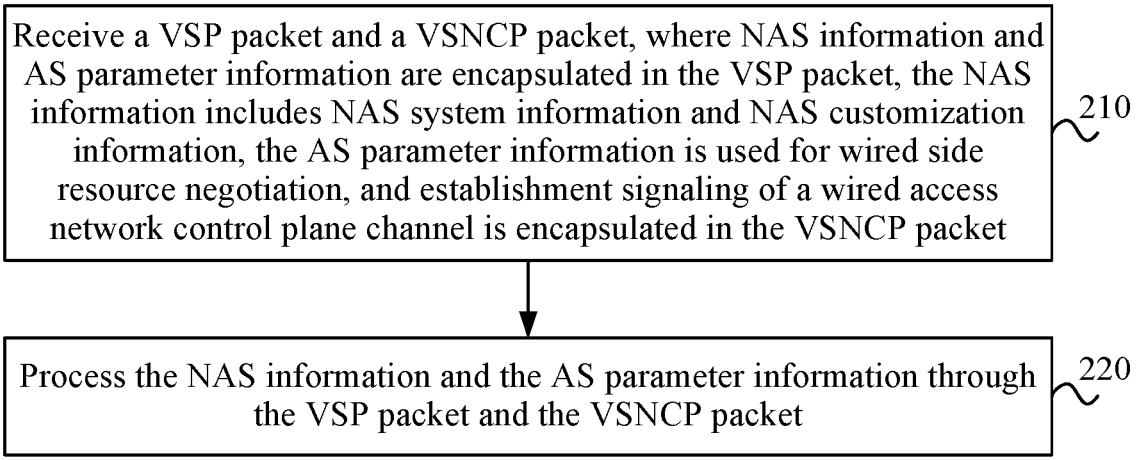
FIG. 4 is a flowchart of an information processing method according to an embodiment.

An embodiment of the present application further provides an information processing method applied to the AGF. FIG. 4 is a flowchart of an information processing method according to an embodiment. As shown in FIG. 4, the method provided in this embodiment includes 210 and 220 described below.

In 210, a VSP packet and a VSNCP packet are received, where NAS information and AS parameter information are encapsulated in the VSP packet, the AS parameter information is used for wired side resource negotiation, and establishment signaling of a wired access network control plane channel is encapsulated in the VSNCP packet.

In 220, the NAS information and the AS parameter information are processed through the VSP packet and the VSNCP packet.

In this embodiment, the AGF receives the VSP packet and the VSNCP packet transmitted by the UE and establishes, according to the establishment signaling encapsulated in the VSNCP packet, the wired access network control plane channel for carrying transmission of the VSP packet, so as to receive the NAS information and the AS parameter information, thereby processing the NAS information and the AS parameter information. For example, the AMF corresponding to the NAS information is determined, and the NAS system information is transparently transmitted or forwarded, so as to provide reliable NAS information for registration and authentication of the user, thereby implementing the registration and authentication of the user. For example, wired side resource negotiation is completed according to the AS parameter information, thereby creating access resources for the UE to access the network.

In an embodiment, receiving the VSP packet and the VSNCP packet includes receiving the VSNCP packet and establishing the wired access network control plane channel according to the VSNCP packet; and receiving, through the wired access network control plane channel, the VSP packet.

In this embodiment, the VSNCP is a protocol used for establishing the wired access network control plane channel between the 5G-RG and the AGF, and the wired access network control plane channel can carry transmission of the VSP packet; the VSP packet carries the NAS information and the AS parameter information so as to implement transmission of the NAS information on the control plane. After the VSNCP packet is encapsulated on the UE side (that is, the 5G-RG), the establishment request information can be transmitted to the AGF, and the AGF replies or responds to the establishment request and establishes the wired access network control plane channel according to the VSNCP packet. Based on this, the AGF can receive the NAS information and the AS parameter information transmitted by the VSP packet, process the NAS information, and further transmit the processed NAS information to the AMF.

In an embodiment, the VSNCP packet includes a code field and a Data field, where the code field is at least one of a third set value, a fourth set value, or a fifth set value; establishing the wired access network control plane channel according to the VSNCP packet includes at least one of the following: in the case where the code field is the third set value, establishing the wired access network control plane channel according to establishment request information in the Data field; in the case where the code field is the fourth set value, replying to a terminal with establishment response information corresponding to the fourth set value; or in the case where the code field is the fifth set value, replying to the terminal with establishment response rejection information corresponding to the fifth set value.

In this embodiment, after encapsulated on the UE side (that is, the 5G-RG), the VSNCP packet is transmitted to the AGF. The AGF establishes the wired access network control plane channel according to the code field and the Data field or responds to the establishment request information. For example, if the code field is the third set value (Code=8), the wired access network control plane channel is established according to the establishment request information; if the establishment request information with a code field of the third set value (Code=8) is normal, the AGF receives the establishment request and replies to the UE with the establishment response information with a code field of the fourth set value (Code=9); if the establishment request information with a code field of the third set value (Code=8) is abnormal, the AGF rejects the establishment request and replies to the UE with the establishment response rejection information with a code filed of the fifth set value (Code=10).

For example, an establishment process between the UE and the AGF may be described below.

In 1, the UE transmits AGF establishment request (Connection-Request) information to the AGF;

In 2, after receiving the establishment request information, the AGF replies to the UE with the establishment response (Connection-Accept) information, thereby completing the establishment of the control plane channel between the UE and the AGF.

Alternatively, the establishment process between the UE and the AGF may be described below.

In 1, the UE transmits AGF establishment request (Connection-Request) information to the AGF.

In 2, after receiving the establishment request information, the AGF replies to the UE with establishment response rejection (Connection-Reject) information, informing the UE that the establishment request of the control plane channel is rejected.

In an embodiment, the VSP packet includes a reserved field and a Data field. Transmitting the NAS information and the AS parameter information to the AMF based on the wired access network control plane channel and the VSP packet includes in the case where the reserved field is a first set value, transparently transmitting the NAS system information encapsulated in the Data field in the VSP packet received based on the wired access network control plane channel to the core network AMF; in the case where the reserved field is a second set value, parsing the NAS customization information encapsulated in the Data field, determining the corresponding AMF, and transmitting, through an N2 interface protocol, the NAS system information with a corresponding reserved field of the first set value to the corresponding AMF; and parsing the AS parameter information and negotiating and parsing wired side network resources according to the AS parameter information; where the AMF is used for authenticating a user registration request.

In this embodiment, after encapsulated on the UE side (that is, the 5G-RG), the VSP packet is transmitted to the AGF, and the AGF processes the NAS information carried in the VSP packet by parsing the content of the VSP packet. For example, in the case where Reserved=1, the NAS system information is encapsulated in the Data field, the AGF transparently transmits and forwards the NAS system information to the core network AMF, and the AMF performs user registration authentication; in the case where Reserved=2, the AGF parses the NAS customization information in the Data field, and the corresponding AMF is selected accordingly. For example, the corresponding AMF is determined according to the Registered AMF in the NAS customization information, and the NAS system information in the case where Reserved=1 is transmitted to the corresponding AMF through the N2 interface protocol. Based on this, the 5G core network completes user access authentication and authorization; in the case where Reserved=2, the AGF further parses the AS parameter information in the Data field, implements resource negotiation on the wired side access network, and creates user plane resources on the wired side.

The information processing method in the preceding embodiment is suitable for a WWC technical scenario. Both the wired access side and the wireless access side are transmitted to the 5G core network through the NAS protocol so as to implement the user access registration, authentication, and authorization. In this manner, the wired side encapsulates the NAS information in the control plane protocol and the AGF processes the packet carrying the NAS information. In this embodiment, based on the VSP and the VSNCP, transmission of the NAS information and the AS parameter information is extended and supported. Based on the application background of the PPP protocol transmission common to existing network and fixed network, an effective and reliable basis is provided for the vendor to implement and formulate standards and specifications.

Figure 5:
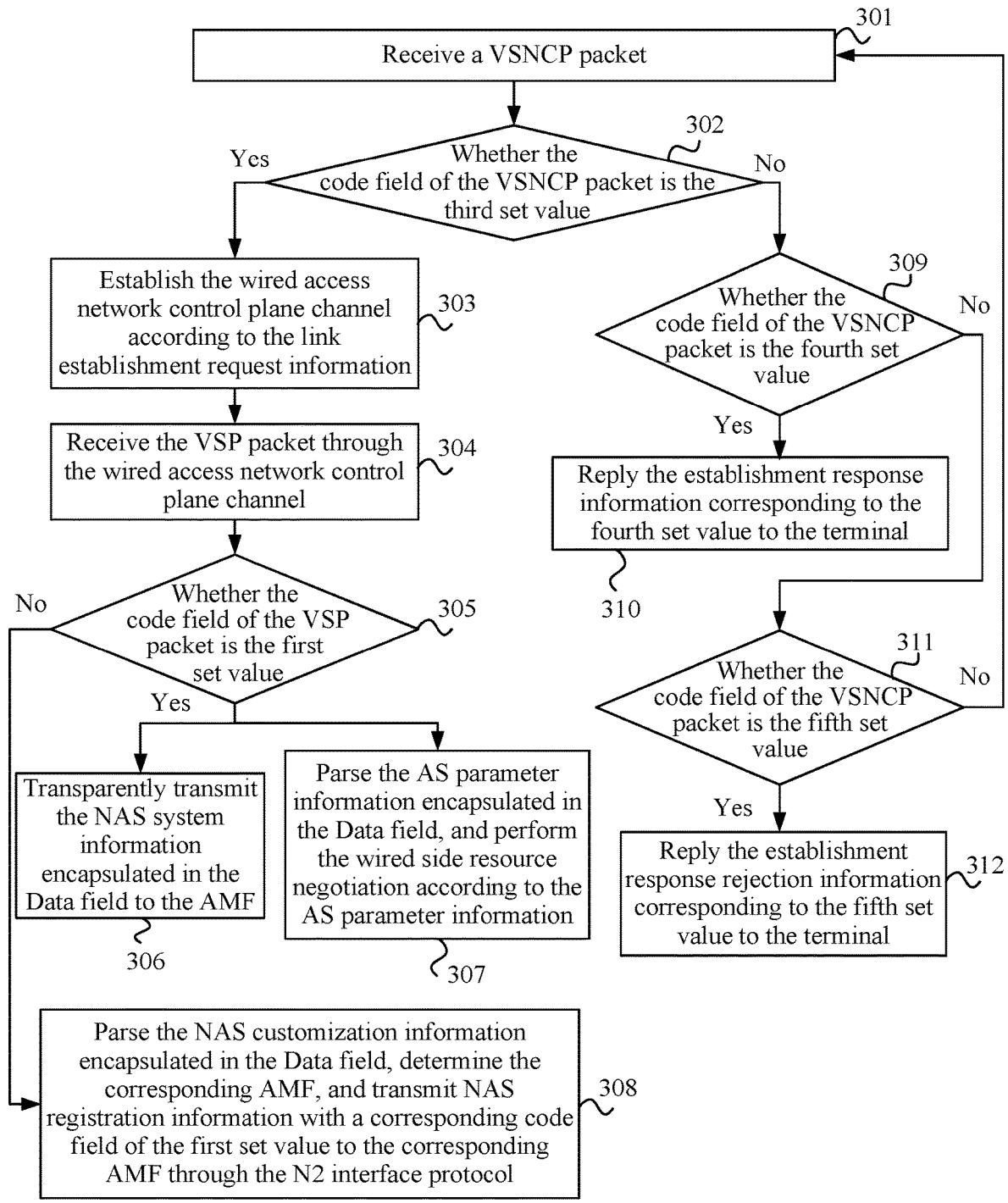
FIG. 5 is a flowchart of an information processing method according to another embodiment.

FIG. 5 is a flowchart of an information processing method according to another embodiment. As shown in FIG. 5, the method includes 301 to 310 described below.

In 301, a VSNCP packet is received.

In 302, whether the code field of the VSNCP packet is the third set value is determined. If yes, 303 is performed; if not, 307 is performed.

In 303, the wired access network control plane channel is established according to the establishment request information.

In 304, the VSP packet is received through the wired access network control plane channel.

In 305, whether the code field of the VSP packet is the first set value is determined. If yes, 306 and 307 are performed; if not, 308 is performed.

In 306, the NAS system information encapsulated in the Data field is transparently transmitted to the AMF.

In this embodiment, for the VSP packet, the reserved field is extended to the first set value or the second set value. For other values, the VSP packet may be received and the NAS information may be acquired, or other applications and functions may be extended.

In 307, the AS parameter information encapsulated in the Data field is parsed, and the wired side resource negotiation is performed according to the AS parameter information.

In 308, the NAS customization information encapsulated in the Data field is parsed, the corresponding AMF is determined, and NAS registration information with a corresponding reserved field of the first set value is transmitted to the corresponding AMF through the N2 interface protocol.

In 309, whether the code field of the VSNCP packet is the fourth set value is determined. If yes, 310 is performed; if not, 311 is performed.

In 310, the establishment response information corresponding to the fourth set value is replied to the terminal.

In 311, whether the code field of the VSNCP packet is the fifth set value is determined. If yes, 312 is performed; if not, 301 is performed and the NAS information is received continuously.

In 312, the establishment response rejection information corresponding to the fifth set value is replied to the terminal.

In this embodiment, the code field of the VSNCP packet is extended to the third set value, the fourth set value, or the fifth set value, and Code-Reject is fed back for other values.

In an embodiment, the processing of the NAS information and the AS parameter information by the AGF may also be implemented only by extending the OUI field. In this case, if the OUI field in the VSNCP is the first identifier (OUI-X), the VSNCP packet is used for carrying the NAS system information; if the OUI field is the second identifier (OUI-Y), the VSNCP packet is used for carrying the NAS customization information and the AS parameter information. The code field of the VSNCP still reuses an original LCP field. In the establishment process of the VSNCP control plane channel, the 5G-RG side transmits a Configure-Request packet with a VSNCP packet code field value of 1 to the AGF, and the AGF replies to the 5G-RG with a Configure-ACK packet with a VSNCP packet code field value of 2 so that the establishment of the VSNCP control plane channel is successfully implemented; if abnormally processing the received Configure-Request packet with a VSNCP packet code field value of 1, the AGF replies to the 5G-RG with a Configure-Reject packet with a VSNCP packet code field value of 3, and the establishment of the VSNCP control plane channel is rejected.

In the information processing method in this embodiment, the AGF establishes the wired access network control plane channel through the VSP packet or the VSNCP packet and processes the NAS information and the AS parameter information, including transparently transmitting the NAS system information to AMF, selecting corresponding AMF, providing reliable information for the registration and authentication of the user by the AMF, and implementing wired side resource negotiation by transmitting the AS parameter information.

Figure 6:
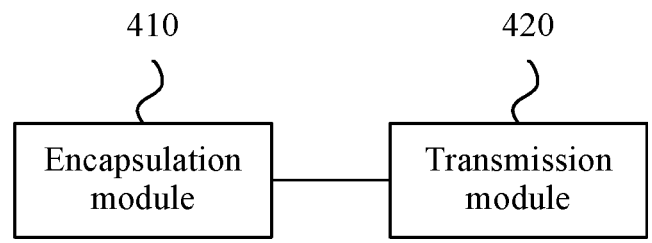
FIG. 6 is a structural diagram of an information transmission apparatus according to an embodiment.

This embodiment further provides an information transmission apparatus. FIG. 6 is a structural diagram of an information transmission apparatus according to an embodiment. As shown in FIG. 6, the information transmission apparatus includes a first encapsulation module 410, a second encapsulation module 420, and a transmission module 430.

The first encapsulation module 410 is configured to encapsulate NAS information and AS parameter information in a VSP packet, where the NAS information includes NAS system information and NAS customization information, and the AS parameter information is used for wired side resource negotiation. The second encapsulation module 420 is configured to encapsulate establishment signaling of a wired access network control plane channel in a VSNCP packet. The transmission module 430 is configured to transmit the NAS information and the AS parameter information through the VSP packet and the VSNCP packet.

This embodiment provides an information transmission apparatus. An embodiment of the present application provides an information transmission method applied to the UE. The method includes encapsulating, through the VSP packet, the NAS information and the AS parameter information, and encapsulating, through the VSNCP packet, the establishment signaling of the wired access network control plane channel, so as to carry transmission of the VSP packet through the wired access network control plane channel, thereby transmitting the NAS information to the AGF. In this manner, transmission reliability of the NAS information is improved. After obtaining the NAS information, the AGF can communicate with the AMF, thereby implementing user registration and authentication and wired side resource negotiation by carrying the AS parameter.

In an embodiment, the VSP packet includes an OUI field, where the OUI field is used for indicating transmission of the NAS information; and the OUI field is designated by an IANA.

In an embodiment, the VSP packet includes a reserved field. In the case where the reserved field is a first set value, the VSP packet is used for transmitting the NAS system information; in the case where the reserved field is a second set value, the VSP packet is used for transmitting the NAS customization information and the AS parameter information.

In an embodiment, the VSP packet includes a Data field. In the case where the reserved field is the first set value, the Data field is used for encapsulating the NAS system information; in the case where the reserved field is the second set value, the Data field is used for encapsulating the NAS customization information and the AS parameter information.

In an embodiment, the VSNCP packet includes an OUI field, where the OUI field is used for indicating establishment of a wired access network control plane channel; and the OUI field is designated by an IANA.

In an embodiment, the VSNCP packet includes a code field, where the code field satisfies at least one of the following: in the case where the code field is a third set value, the VSNCP packet is used for transmitting establishment request information of the wired access network control plane channel; in the case where the code field is a fourth set value, the VSNCP packet is used for transmitting establishment response information of the wired access network control plane channel; in the case where the code field is a fifth set value, the VSNCP packet is used for transmitting establishment response rejection information of the wired access network control plane channel.

In an embodiment, the VSNCP packet includes a Data field, where the Data field satisfies at least one of the following: in the case where the code field is the third set value, the Data field is used for encapsulating the establishment request information; in the case where the code field is the fourth set value, the Data field is used for encapsulating the establishment response information; in the case where the code field is the fifth set value, the Data field is used for encapsulating the establishment response rejection information.

In an embodiment, the VSNCP packet includes an OUI field. In the case where the OUI field is a first identifier, the VSNCP packet is used for carrying transmission of the NAS system information; in the case where the OUI field is a second identifier, the VSNCP packet is used for carrying transmission of the NAS customization information and the AS parameter information.

In an embodiment, the VSNCP packet further includes a length field and a Data field, where the length field and the Data field are used for encapsulating the NAS system information or used for encapsulating the NAS customization information and the AS parameter information.

In an embodiment, the NAS system information includes access network parameters and registration request information, where the registration request information includes at least one of the following: a registration type, a security parameter, target NSSAI, a core network characteristic parameter, or PDU session information; the PDU session information includes at least one of the following: Registration-Response information, Registration-Accept information, Registration-Modification-Request information, Registration-Modification-Response information, Service-Request information, or Service-Response information; the NAS customization information includes at least one of the following: a TMSI, a PLMN, an AMF, or S-NSSAI; the NAS customization information is determined according to upper-layer NAS information.

This embodiment provides an information transmission apparatus. For technical details not described in this embodiment, reference may be made to any of the preceding embodiments of the information transmission method, and this embodiment has the same technical effect as the performed information transmission method.

Figure 7:
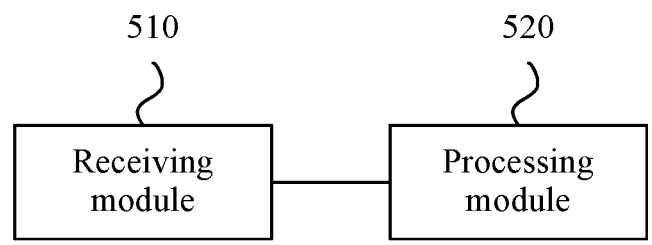
FIG. 7 is a structural diagram of an information processing apparatus according to an embodiment.

An embodiment of the present application further provides an information processing apparatus. FIG. 7 is a structural diagram of an information processing apparatus according to an embodiment. As shown in FIG. 7, the information transmission apparatus includes a receiving module 510 and a processing module 520.

The receiving module 510 is configured to receive a VSP packet and a VSNCP packet, where NAS information and an AS parameter information identifier are encapsulated in the VSP packet, and establishment signaling of a wired access network control plane channel is encapsulated in the VSNCP packet. The processing module 520 is configured to process the NAS information and the AS parameter information according to the VSP packet and the VSNCP packet, where the NAS information includes NAS system information and NAS customization information, and the AS parameter information is used for wired side resource negotiation.

A signal processing apparatus in this embodiment processes the NAS information or the AS parameter information by receiving the VSP packet and the VSNCP packet transmitted by the UE and according to the establishment signaling of the wired access network control plane channel encapsulated in the packets. For example, the AMF corresponding to the NAS information is determined, the NAS system information is transparently transmitted or forwarded, the user registration and authentication are implemented, and the wired side resource negotiation is completed according to the AS parameter information.

In an embodiment, the receiving module 510 includes a VSNCP receiving module and a VSP receiving module, where the VSNCP receiving module is configured to receive the VSNCP packet and establish the wired access network control plane channel according to the VSNCP packet, and the VSP receiving module is configured to receive the VSP packet through the wired access network control plane channel.

In an embodiment, the VSNCP packet includes a code field and a Data field, where the code field is at least one of a third set value, a fourth set value, or a fifth set value; an establishment module is configured to perform at least one of the following: in the case where the code field is the third set value, establishing the wired access network control plane channel according to establishment request information in the Data field; in the case where the code field is the fourth set value, replying to a terminal with establishment response information corresponding to the fourth set value; or in the case where the code field is the fifth set value, replying to the terminal with establishment response rejection information corresponding to the fifth set value.

In an embodiment, the VSP packet includes a reserved field and a Data field. The processing module 520 is configured to: in the case where the reserved field is a first set value, transparently transmit the NAS system information encapsulated in the Data field in the VSP packet received based on the wired access network control plane channel to the core network AMF; in the case where the reserved field is a second set value, parse the NAS customization information or the AS parameter information encapsulated in the Data field, determine the corresponding AMF, and transmit, through an N2 interface protocol, the NAS system information with a corresponding reserved field of the first set value to the corresponding AMF, where the AS parameter information is used for negotiation of the access network resources between the 5G-RG and the AGF; and parse the AS parameter information and negotiate wired side network resources according to the AS parameter information. The AMF is used for authenticating a user registration request.

This embodiment provides an information processing apparatus. For technical details not described in this embodiment, reference may be made to any of the preceding embodiments of the information processing method, and this embodiment has the same technical effect as the performed information processing method.

An embodiment of the present application provides a terminal. The information transmission method may be performed by the information transmission apparatus which may be implemented by software and/or hardware and integrated in the terminal. Further, the terminal includes, but is not limited to, a user terminal such as a desktop computer, a notebook computer, a smart phone, and a tablet computer.

Figure 8:
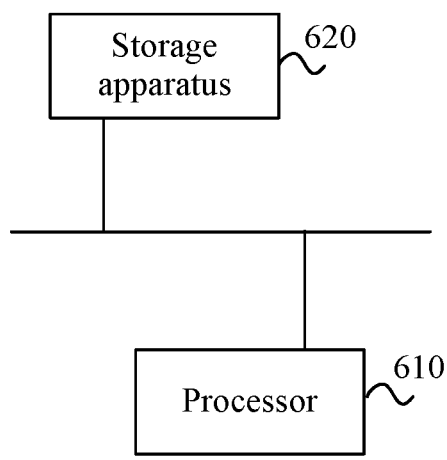
FIG. 8 is a schematic diagram of a hardware structure of a terminal according to an embodiment.

FIG. 8 is a schematic diagram of a hardware structure of a terminal according to an embodiment. As shown in FIG. 8, the terminal provided in this embodiment includes a processor 610 and a storage apparatus 620. The terminal may include one or more processors. One processor 610 is shown as an example in FIG. 8. The processor 610 and the storage apparatus 620 in the device may be connected via a bus or in other manners. The connection via the bus is shown as an example in FIG. 8.

One or more programs are executed by one or more processors 610 to cause the one or more processors to perform the information transmission method in any one of the preceding embodiments.

The storage apparatus 620 in the terminal, as a computer-readable storage medium, may be configured to store one or more programs which may be software programs, computer-executable programs and modules, such as program instructions/modules (for example, modules in the information transmission apparatus, which include an encapsulation module 410 and a transmission module 420, as shown in FIG. 6) corresponding to the information transmission method in embodiments of the present disclosure. The processor 610 runs the software programs, instructions and modules stored in the storage apparatus 620 to execute function applications and data processing of the terminal, that is, to perform the information transmission method in the preceding method embodiments.

The storage apparatus 620 mainly includes a program storage region and a data storage region. The program storage region may store an operating system and an application program required by at least one function. The data storage region may store data (such as NAS system information and NAS customization information in the preceding embodiments) created based on use of the device. Additionally, the storage apparatus 620 may include a high-speed random-access memory and may further include a nonvolatile memory such as at least one disk memory, a flash memory or another nonvolatile solid-state memory. In some examples, the storage apparatus 620 may further include memories located remotely relative to the processor 610, and these remote memories may be connected to the terminal via a network. Examples of the preceding network include, but are not limited to, the Internet, an intranet, a local area network, a mobile communication network and a combination thereof.

When one or more programs included in the preceding terminal are executed by the one or more processors 610, the following operations are implemented: NAS information and AS parameter information are encapsulated in a VSP packet, where the NAS information includes NAS system information and NAS customization information, and the AS parameter information is used for wired side resource negotiation; establishment signaling of a wired access network control plane channel is encapsulated in a VSNCP packet; and the NAS information and the AS parameter information are transmitted through the VSP packet and the VSNCP packet.

This embodiment provides a terminal. For technical details not described in this embodiment, reference may be made to any of the preceding embodiments of the information transmission method, and this embodiment has the same technical effect as the performed information transmission method.

Figure 9:
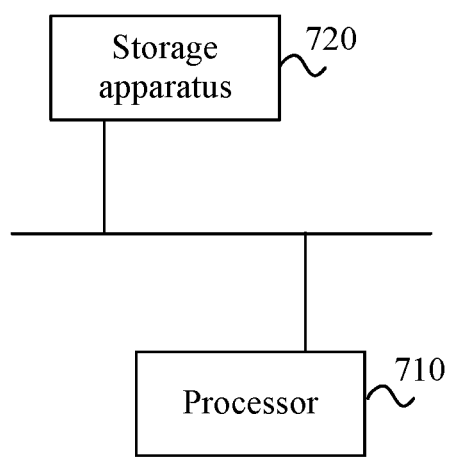
FIG. 9 is a schematic diagram of a hardware structure of a network element according to an embodiment.

An embodiment of the present application further provides a network element. The information processing method may be performed by the information processing apparatus which may be implemented by software and/or hardware and integrated in the network element. FIG. 9 is a schematic diagram of a hardware structure of a network element according to an embodiment. As shown in FIG. 9, the network element provided in this embodiment includes a processor 610 and a storage apparatus 620. The network element may include one or more processors. One processor 610 is shown as an example in FIG. 9. The processor 610 and the storage apparatus 620 in the device may be connected via a bus or in other manners. The connection via the bus is shown as an example in FIG. 9.

One or more programs are executed by one or more processors 610 to cause the one or more processors to perform the information processing method in any one of the preceding embodiments.

The storage apparatus 620 in the network element, as a computer-readable storage medium, may be configured to store one or more programs which may be software programs, computer-executable programs and modules, such as program instructions/modules (for example, modules in the information processing apparatus, which include a receiving module 510 and a processing module 520, as shown in FIG. 7) corresponding to the information processing method in embodiments of the present disclosure. The processor 610 runs the software programs, instructions and modules stored in the storage apparatus 620 to execute function applications and data processing of the network element, that is, to perform the information processing method in the preceding method embodiments.

The storage apparatus 620 mainly includes a program storage region and a data storage region. The program storage region may store an operating system and an application program required by at least one function. The data storage region may store data (such as NAS system information and NAS customization information included in NAS information in the preceding embodiments) created based on use of the device. Additionally, the storage apparatus 620 may include a high-speed random-access memory and may further include a nonvolatile memory such as at least one disk memory, a flash memory or another nonvolatile solid-state memory. In some examples, the storage apparatus 620 may further include memories located remotely relative to the processor 610, and these remote memories may be connected to the network element via a network. Examples of the preceding network include, but are not limited to, the Internet, an intranet, a local area network, a mobile communication network and a combination thereof.

When one or more programs included in the preceding network element are executed by the one or more processors 610, the following operations are implemented: receiving a VSP packet and a VSNCP packet, where NAS information and AS parameter information are encapsulated in the VSP packet, the NAS information includes NAS system information and NAS customization information, the AS parameter information is used for wired side resource negotiation, and establishment signaling of a wired access network control plane channel is encapsulated in the VSNCP packet; and processing the NAS information and the AS parameter information according to the VSP packet and the VSNCP packet.

This embodiment provides a network element. For technical details not described in this embodiment, reference may be made to any of the preceding embodiments of the information processing method, and this embodiment has the same technical effect as the performed information processing method.

The embodiments of the present application further provides a storage medium including computer-executable instructions, and the computer-executable instructions are used for performing an information transmission method or an information processing method when executed by a computer processor.

From the preceding description of embodiments, it is to be understood by those skilled in the art that the present application may be implemented by use of software and general-purpose hardware or may be implemented by hardware. The technical solutions of the present application may be embodied in the form of a software product. The software product in a computer may be stored in a computer-readable storage medium such as a floppy disk, a read-only memory (ROM), a random-access memory (RAM), a flash memory, a hard disk or an optical disk in the computer and includes multiple instructions for enabling a computer device (which may be a personal computer, a server or a network device) to perform the information transmission method or the information processing method in any embodiment of the present application.

The above are only exemplary embodiments of the present application and are not intended to limit the scope of the present application.

A block diagram of any logic flow among the drawings of the present application may represent program steps, may represent interconnected logic circuits, modules and functions, or may represent a combination of program steps with logic circuits, modules, and functions. Computer programs may be stored in a memory. The memory may be in any type suitable for the local technical environment and may be implemented using any suitable data storage technology, for example, but not limited to, a read-only memory (ROM), a random-access memory (RAM), and an optical memory apparatus and system (a digital video disc (DVD) or a compact disc (CD)). Computer-readable media may include non-transitory storage media. The data processor may be of any type suitable to the local technical environment, such as, but is not limited to, a general purpose computer, a special purpose computer, a microprocessor, a digital signal processing (DSP), an application specific integrated circuit (ASIC), a field-programmable gate array (FPGA), and a processor based on a multi-core processor architecture.

What is claimed is:

1. An information transmission method, applied to a terminal, comprising:
encapsulating non-access stratum (NAS) information and access resource (AS) parameter information in a vendor-specific protocol (VSP) packet, wherein the NAS information comprises NAS system information and NAS customization information, and the AS parameter information is used for wired side resource negotiation;
encapsulating establishment signaling of a wired access network control plane channel in a vendor-specific network control protocol (VSNCP) packet; and
transmitting the NAS information and the AS parameter information through the VSP packet.

2. The method of claim 1, wherein the VSP packet comprises an organizationally unique identifier (OUI) field, wherein the OUI field is used for indicating transmission of the NAS information and the AS parameter information, and the OUI field are designated by an internet assigned numbers authority (IANA).

3. The method of claim 1, wherein the VSP packet comprises a reserved field;
wherein in a case where the reserved field is a first set value, the VSP packet is used for transmitting the NAS system information; and
in a case where the reserved field is a second set value, the VSP packet is used for transmitting the NAS customization information and the AS parameter information.

4. The method of claim 3, wherein the VSP packet further comprises a data field;
wherein in a case where the reserved field is the first set value, the data field is used for encapsulating the NAS system information; and
in a case where the reserved field is the second set value, the data field is used for encapsulating the NAS customization information and the AS parameter information.

5. The method of claim 1, wherein the NAS system information comprises an access network parameter and registration request information;
wherein the registration request information comprises at least one of the following: a registration type, a security parameter, target network slice selection assistance information (NSSAI), a core network characteristic parameter, or packet data unit (PDU) session information;
the PDU session information comprises at least one of the following: registration response information, registration accept information, registration modification request information, registration modification response information, service request information, or service response information;
the NAS customization information comprises at least one of the following:
a temporary mobile subscriber identifier (TMSI), a public land mobile network (PLMN), an access and mobility management function (AMF), or single network slice selection assistance information (S-NSSAI);
wherein the NAS customization information is determined according to upper-layer NAS information.

6. An information processing method, applied to an access gateway function (AGF), comprising:
receiving a vendor-specific protocol (VSP) packet and a vendor-specific network control protocol (VSNCP) packet, wherein non-access stratum (NAS) information and access resource (AS) parameter information are encapsulated in the VSP packet, the NAS information comprises NAS system information and NAS customization information, the AS parameter information is used for wired side resource negotiation, and establishment signaling of a wired access network control plane channel is encapsulated in the VSNCP packet; and
processing the NAS information and the AS parameter information according to the VSP packet.

7. The method of claim 6, wherein receiving the VSP packet and the VSNCP packet comprises:

receiving the VSNCP packet and establishing the wired access network control plane channel according to the VSNCP packet; and receiving the VSP packet through the wired access network control plane channel.

8. The method of claim 7, wherein the VSNCP packet comprises a code field and a data field, wherein the code field is at least one of a third set value, a fourth set value, or a fifth set value;

wherein establishing the wired access network control plane channel according to the VSNCP packet comprises at least one of the following:

in a case where the code field is the third set value, establishing the wired access network control plane channel according to establishment request information in the data field;

in a case where the code field is the fourth set value, replying to a terminal with establishment response information corresponding to the fourth set value; or in a case where the code field is the fifth set value, replying to a terminal with establishment response rejection information corresponding to the fifth set value.

9. The method of claim 7, wherein the VSP packet comprises a reserved field and a data field;

wherein processing the NAS information and the AS parameter information through the VSP packet and the VSNCP packet comprises:

in a case where the reserved field is a first set value, transparently transmitting the NAS system information encapsulated in the data field to an access and mobility management function (AMF);

in a case where the reserved field is a second set value, parsing the NAS customization information encapsulated in the Data field, determining the AMF corresponding to the parsed NAS customization information, and transmitting through an N2 interface the NAS system information in the case where the reserved field is the first set value to the AMF corresponding to the parsed NAS customization information; and parsing the AS parameter information and negotiating wired side network resources according to the parsed AS parameter information;

wherein the AMF is used for authenticating a user registration request.

10. A terminal, comprising:

at least one processor; and a storage apparatus, which is configured to store at least one program;

wherein when executed by the at least one processor, the at least one program causes the at least one processor to:

encapsulate non-access stratum (NAS) information and access resource (AS) parameter information in a vendor-specific protocol (VSP) packet, wherein the NAS information comprises NAS system information and NAS customization information, and the AS parameter information is used for wired side resource negotiation;

encapsulate establishment signaling of a wired access network control plane channel in a vendor-specific network control protocol (VSNCP) packet; and transmit the NAS information and the AS parameter information through the VSP packet.

11. The terminal of claim 10, wherein the VSP packet comprises an organizationally unique identifier (OUI) field, wherein the OUI field is used for indicating transmission of the NAS information and the AS parameter information, and the OUI field are designated by an internet assigned numbers authority (IANA).

12. The terminal of claim 10, wherein the VSP packet comprises a reserved field;

wherein in a case where the reserved field is a first set value, the VSP packet is used for transmitting the NAS system information; and in a case where the reserved field is a second set value, the VSP packet is used for transmitting the NAS customization information and the AS parameter information.

13. The terminal of claim 12, wherein the VSP packet further comprises a data field;

wherein in a case where the reserved field is the first set value, the data field is used for encapsulating the NAS system information; and in a case where the reserved field is the second set value, the data field is used for encapsulating the NAS customization information and the AS parameter information.

14. A network element, comprising:

at least one processor; and a storage apparatus, which is configured to store at least one program;

wherein when executed by the at least one processor, the at least one program causes the at least one processor to perform:

receiving a vendor-specific protocol (VSP) packet and a vendor-specific network control protocol (VSNCP) packet, wherein non-access stratum (NAS) information and access resource (AS) parameter information are encapsulated in the VSP packet, the NAS information comprises NAS system information and NAS customization information, the AS parameter information is used for wired side resource negotiation, and establishment signaling of a wired access network control plane channel is encapsulated in the VSNCP packet; and processing the NAS information and the AS parameter information according to the VSP packet.

15. The network element of claim 14, wherein when executed by the at least one processor, the at least one program causes the at least one processor to perform:

receiving the VSNCP packet and establishing the wired access network control plane channel according to the VSNCP packet; and receiving the VSP packet through the wired access network control plane channel.

16. The network element of claim 15, wherein the VSNCP packet comprises a code field and a data field, wherein the code field is at least one of a third set value, a fourth set value, or a fifth set value;

wherein when executed by the at least one processor, the at least one program causes the at least one processor to perform:

in a case where the code field is the third set value, establishing the wired access network control plane channel according to establishment request information in the data field;

in a case where the code field is the fourth set value, replying to a terminal with establishment response information corresponding to the fourth set value; or in a case where the code field is the fifth set value, replying to a terminal with establishment response rejection information corresponding to the fifth set value.

17. The network element of claim 15, wherein the VSP packet comprises a reserved field and a data field;

wherein when executed by the at least one processor, the at least one program causes the at least one processor to perform:

in a case where the reserved field is a first set value, transparently transmitting the NAS system information encapsulated in the data field to an access and mobility management function (AMF);

in a case where the reserved field is a second set value, parsing the NAS customization information encapsulated in the Data field, determining the AMF corresponding to the parsed NAS customization information, and transmitting through an N2 interface the NAS system information in the case where the reserved field is the first set value to the AMF corresponding to the parsed NAS customization information; and parsing the AS parameter information and negotiating wired side network resources according to the parsed AS parameter information;

wherein the AMF is used for authenticating a user registration request.

* * * * *